CHARACTER TIMING AND READOUT OF DUAL-RAIL SHIFT REGISTER

Filed Sept. 12, 1966

INVENTOR
G. E. LARSON
R. C. Lipton
ATTORNEY

United States Patent Office 3,509,327
Patented Apr. 28, 1970

3,509,327
CHARACTER TIMING AND READOUT OF DUAL-RAIL SHIFT REGISTER

Glenn E. Larson, Malverne, N.Y., assignor to Bell Telephone Laboratories, Incorporated, Murray Hill and Berkeley Heights, N.J., a corporation of New York Filed Sept. 12, 1966, Ser. No. 578,737
Int. Cl. G06f 5/00
U.S. Cl. 235—154 5 Claims

ABSTRACT OF THE DISCLOSURE

Incoming information in the form of data character binary elements is stored in a dual-rail shift register by applying a bit to the input stage of the shift register rail which represents the binary condition of the element. Upon reception of the start element of the character, however, a bit is applied to both rails. The "double" bit is thereafter detected, when shifted to the final stage of the rails, to terminate the shifting of the data and to effect character readout.

Figure 1:
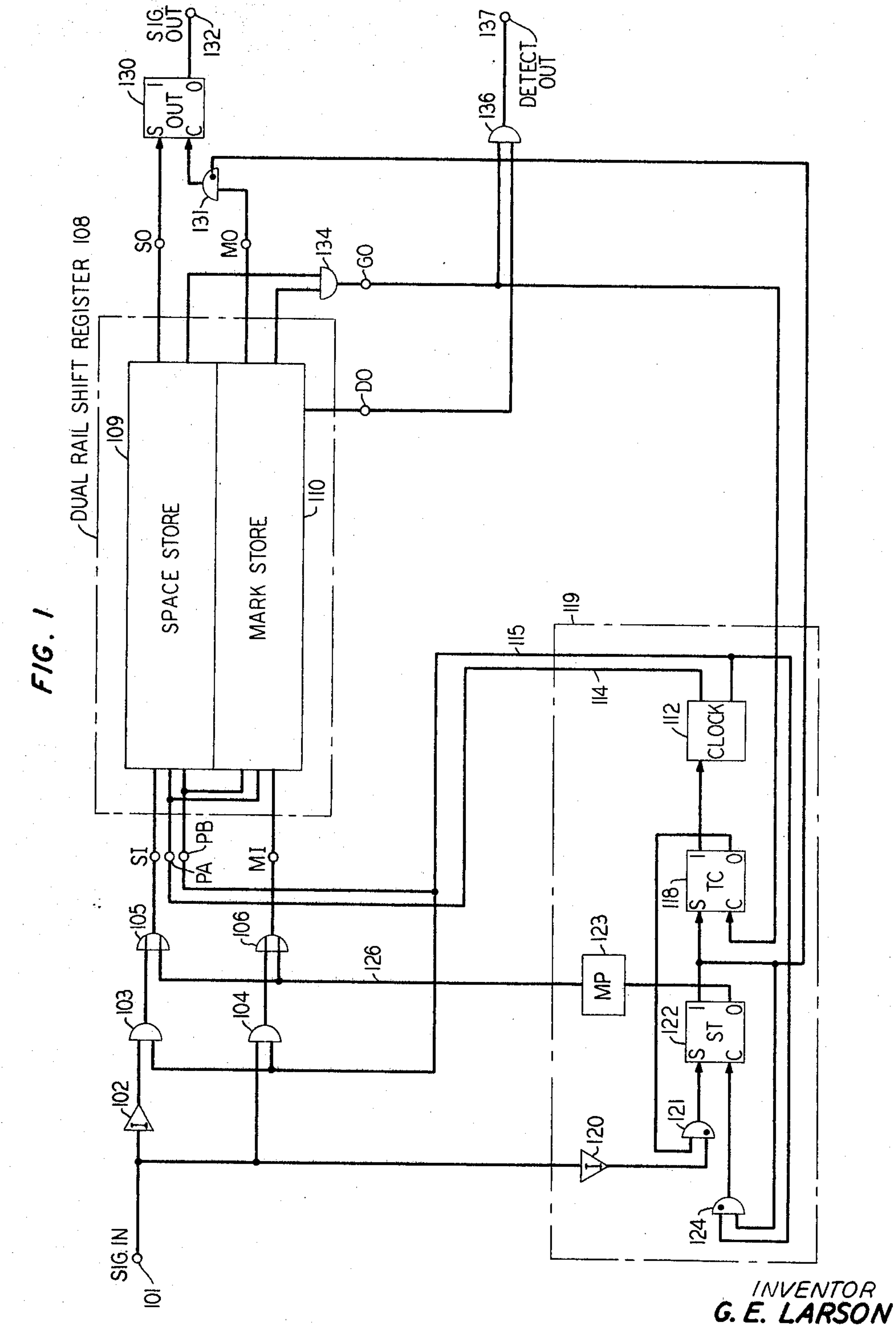

This invention relates to temporary and buffer stores for data receivers and, more particularly, to multistage shift registers for storing data character elements received in serial form for subsequent parallel and serial readout.

A broad object of this invention is to provide an improved data storage arrangement suitable for serial-to-serial and serial-to-parallel conversion of data character elements.

The multistage shift register provides a unique arrangement for temporarily storing data character elements for subsequent readout in parallel and serial form. Concurrent parallel and serial readout is preferable, for example, when the ultimate receiving device is a register or recorder which is enabled to accept data in serial form after a predetermined incoming data character is detected. The shift register can provide a temporary store for each character, permitting a parallel readout as each character is fully stored for detecting the predetermined character which initiates the recording or registering operation and, thereafter, permitting the necessary serial readout to the recorder.

In providing parallel readout for detection of the character elements in the store, care must be taken that elements of each other characters are not included therein. Preferably, the number of stages in the shift register do not exceed the number of signal elements in the code characters so that when a character is fully stored the stages do not contain elements of other characters. When start-stop code is employed wherein the first element of each character is invariably a spacing signal, sometimes called a start signal, the shifting of the start signal through the register to the final stage indicates the full storage of the character. Advantageously, the shifting of the start element to the final stage may be detected to initiate the parallel readout. However, where serial readout is also provided, other spacing elements in the character, in addition to the start signal, are shifted through the final stage, causing difficulty in identifying the start signal.

Accordingly, it is an object of this invention to identify the start signal in the presence of other signal elements.

It is a further object of this invention to render the stored start signal unique with respect to other signal elements of the character.

In accordance with a preferred storage arrangement, the incoming data character signals are scanned by a clock circuit which recognizes the start signal of the character and in response thereto applies the scanned signals, double rail, to the initial stages of a dual-rail shift register. The shift register includes a mark signal store and a space signal store, the clock circuit inserting a "1" bit in the mark store when a mark element is scanned and inserting a "1" bit in the space store when a space element is scaned. Output signals may be obtained in serial form from the shift register by reading out double rail the final stages of both stores. Alternatively, parallel readout may concurrently be provided to detect the character in the shift register by simultaneously reading the bits stored in the several stages of both the mark and space stores when the complete character has been inserted by the clock circuit.

It is a feature of this invention that the clock circuit upon the detection of the start element inserts a double "1" bit in a dual-rail shift register, that is, the clock circuit concurrently inserts a "1" bit in the intial stage of the mark store and a "1" bit in the initial stage of the space store. This unique signal invariably indicates the storage of the start element in the stage.

In accordance with another feature of this invention, the presence of the start element in the final stage of the dual-rail shift register is detected by recognition of the double "1" bit in the mark and space stores. For the purpose of parallel readout, the concurrent reading of the several stages of the stores is enabled by the double "1" bit detector since the shifting of the start element to the final stage indicates that the complete character has been inserted in the shift register. Another function of the double "1" bit detector involves the restoration of the clock circuit to conclude the scanning of the data character and prepare the clock circuit for the recognition of the start signal of the next successive data character. For double rail readout in serial form the mark store readout is inhibited when the double "1" bit start signal is readout of the final stages to restore the start signal to a spacing element.

Figure 2:
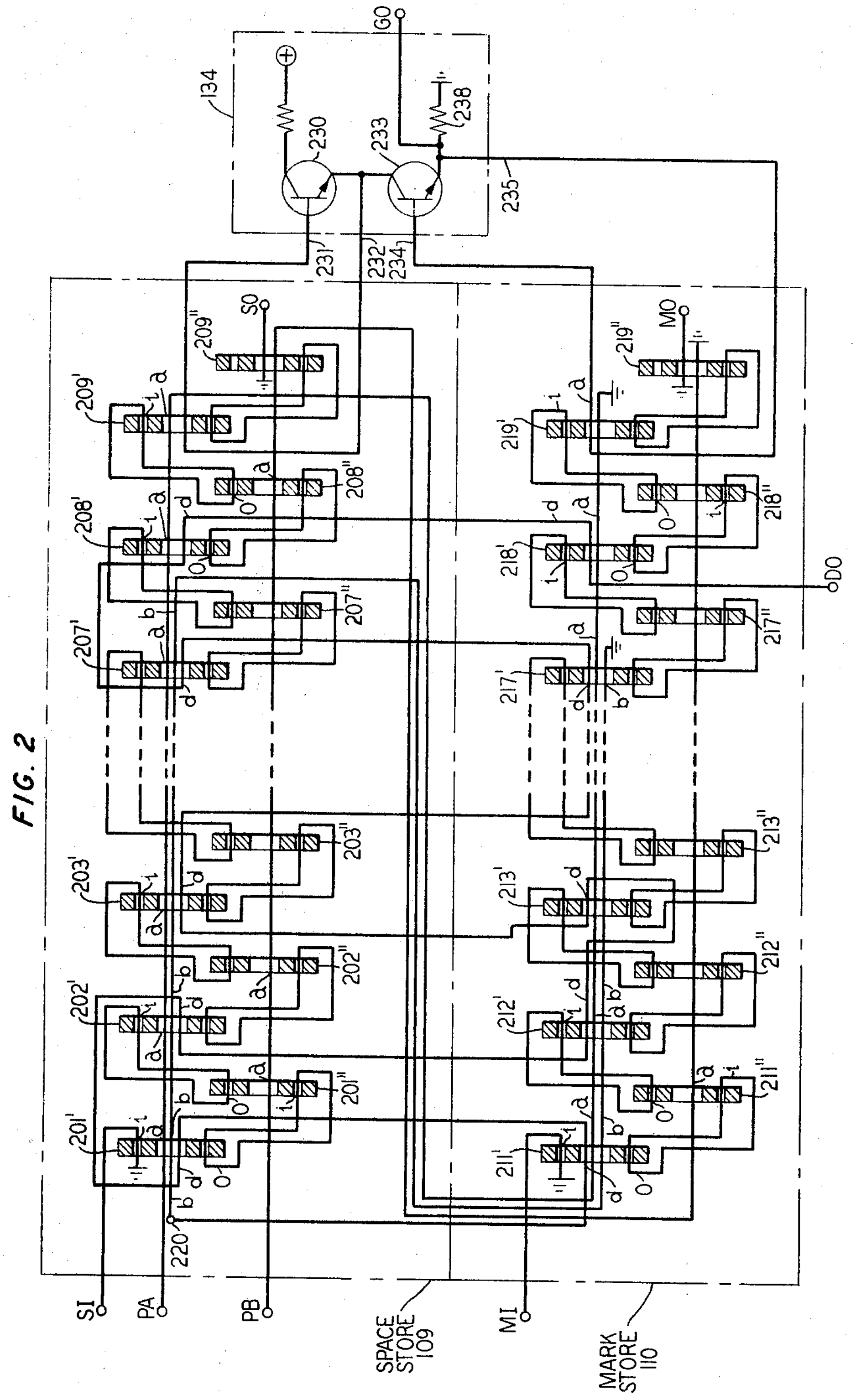

The foregoing and other objects and features of this invention will be more fully understood from the following description of an illustrative embodiment thereof taken in conjunction with the accompanying drawing wherein:

FIG. 1 shows in schematic form the circuits and the equipment and the manner in which they are arranged to cooperate to provide input scanning and output readout of a dual-rail shift register in accordance with this invention; and FIG. 2 illustrates the details of a dual-rail shift register storage circuit and a readout detector suitable for use with this invention.

Referring now to the drawing and especially to FIG. 1, incoming signals are received on input terminal 101. In accordance with the illustrative embodiment, these signals preferably comprise ASCII code. As is well known in the art, ASCII code arranged for teletypewriter purposes comprises data characters containing eleven mark or space elements. The initial element of each character of the code invariably comprises a spacing start signal; the final two elements invariably comprise marking stop signals and the intermediate eight elements comprise variably permutated mark and space intelligence signals, which intelligence signals designate the particular code character. The eighth or final intelligence element may comprise a parity bit although, as utilized with the illustrative embodiment, parity is not employed and the element is always marking. Preferably, the spacing elements comprise a signal voltage condition which is relatively negative with respect to the marking signal element.

In general, when a start element is detected the incoming signals are scanned by gates 103 and 104, under control of gate circuit 119, the scanned signals are applied, double rail, to space input terminal SI and mark input terminal MI of dual-rail shift register 108 and shifted through shift register 108. During the scanning of the next character the signals are fed double rail and serially to OUT flip-flop 130 via shift register output terminals SO and MO. Flip-flop 130, in turn, passes the signals, serially, to output terminal 132. Gate 131 precludes passage of a marking signal to OUT flip-flop 130 when a start signal is detected for reasons explained hereinafter.

The outputs of shift register 108 are also connected to gate 134 which, as described hereinafter, detects the shifting of the start element to the final stages of shift register 108. Upon detection of the start element, gate 134 enables a concurrent or parallel readout of the several stages of shift register 108 by way of terminal DO and gate 136. In addition, when gate 134 detects the start element, gate circuit 119 is restored to terminate incoming signal scanning until the next incoming start element is detected.

As seen in FIG. 1, terminal 101 is connected to the input of inverter 102 which in turn is connected to one input of AND gate 103. Accordingly, the inverted signal is applied to one input of AND gate 103 whereby a positive enabling potential is applied to the one input of gate 103 upon the reception of spacing elements. Terminal 101 is also connected to one input of AND gate 104. Positive potential is therefore applied to gate 104 upon the reception of marking elements.

The other inputs of gates 103 and 104 extend to lead 115 which is connected to an output of element timer clock 112 in clock circuit 119. As described hereinafter, clock 112 applies a pulse to lead 115 at the theoretical midpoint of each of the character elements. Accordingly, with the clock pulse applied to gates 103 and 104 at the element midpoint, the gates scan the incoming element. Gate 103 produces an output pulse in the event that a spacing signal is received and gate 104 produces an output pulse in the event that a marking signal is received.

The output of gate 103 is passed by way of OR gate 105 to the spacing input terminal SI of dual-rail shift register 108 and the output of gate 104 is passed by way of OR gate 106 to the marking input terminal MI of dual-rail shift register 108. As seen in FIG. 1, terminal SI extends to space store 109 and terminal MI extends to mark store 110 in shift register 108. Thus, when a spacing signal is scanned a "1" bit is inserted in space store 109 and when a marking signal is scanned a "1" bit is stored in mark store 110 of dual-rail shift register 108.

The other inputs to OR gates 105 and 106 extend via lead 126 to monopulser 123 of gate circuit 119 and monopulser 123 is connected, in turn, to the "0" output terminal of ST flip-flop 122. As described hereinafter, ST flip-flop 122 is cleared at the theoretical midpoint of the start element thereby operating monopulser 123 which provides a positive pulse to OR gates 105 and 106. Thus pulses are concurrently applied to input terminals SI and MI at the midpoint of the start element of the character whereby a double "1" bit is inserted in space store 109 and mark store 110 corresponding to the reception of the start element by input terminal 101.

As previously described, dual-rail shift register 108 comprises two shift registers, namely, space store register 109 and mark store register 110. Each store as described hereinafter is a transfluxor shift register having nine stages, each stage including a primary magnetic core and an intermediate magnetic core. Shift pulses for both space store 109 and mark store 110 are provided thereto by way of input terminals PA and PB, which terminals are connected by way of leads 114 and 115, respectively, to the output of element timer clock 112 in clock circuit 119.

The pulse provided to output lead 114 by clock 112, as described hereinafter, occurs concurrently with the element transition as previously disclosed. The pulse applied to lead 115, which is also used as a scanning pulse, occurs at the theoretical midpoint of the character element. The pulse passed by lead 114 to terminal PA, hereinafter referred to as the phase A shift pulse, functions to shift the bits stored in the primary core of each stage to the intermediate core of the corresponding stage of both stores 109 and 110, while the function of the pulse applied by lead 115 to terminal PB, hereinafter referred to as the phase B shift pulse, shifts the bits from the intermediate cores to the primary cores of the next successive stage. Accordingly, when clock 112 produces a pulse on lead 115, the scanned element is inserted in the primary core of the initial stage of the appropriate one of the store. Concurrently therewith the phase B shift pulse shifts the previously inserted bits from the intermediate cores to the primary cores of the next successive stages. Thereafter when the phase A shift pulse is produced all the bits in the primary cores are shifted to intermediate cores of the corresponding stages. Then, the received spacing and marking elements are inserted in the first stages of stores 109 and 110, respectively, and shifted down through the stages therein concurrently with the insertion of each of the succeeding elements in the initial stages of stores 109 and 110.

The primary core outputs are applied to AND gate 134 from the final stages of space store 109 and mark store 110. Since each store contains nine stages, it is apparent that when the final stage is storing the double "1" bit corresponding to the start element, the initial eight stages are storing the eight intelligence elements. Thus, both of the input leads to gate 134 are energized when the full character is stored in the primary cores of the dual-rail shift register 108 since both inputs of gate 134 are energized when the double "1" bit is shifted to the final stage. Output terminal GO of gate 134 is, therefore, pulsed, indicating that the start element, as identified by the unique double "1" bit, has been detected in the final stages of stores 109 and 110 and further indicating the storage of the full character in shift register 108. The gate 134 output pulse on terminal GO is applied to an input lead of AND gate 136, and the clear input of TC flip-flop 118 in clock circuit 119 for purposes described below.

The pulse produced at terminal GO upon the detection of the double "1" bit start element in the final stages of shift register 108 is supplied to one input of AND gate 136 as previously described. The other input to AND gate 136 extends to output terminal DO of shift register 108. As described hereinafter, output terminal DO is connected to a lead extending to windings on the primary cores in space store 109 and mark store 110. The manner in which the lead is wound is so arranged to provide an energizing pulse output when the stores contain a predetermined permutation of bits corresponding to a predetermined character that it is desired to be detected. Thus, one input lead to AND gate 136 is enabled when the double "1" bit start signal is detected and the other input to gate 136 is energized when the predetermined permutation of bits in the shift register is detected. Gate 136 thus provides an output pulse when a predetermined character is fully stored in shift register 108. This pulse is passed to output terminal 137 which may be utilized for example to enable a register to thereafter store signals subsequently received from output terminal 132. Accordingly, an arrangement may be provided to enable the storage of signals upon the reception of a predetermined character.

The pulse provided at output terminal GO upon detection of the double "1" bit is also applied to clock clock control circuit 119. This circuit includes ST flip-flop 122, TC flip-flop 118, and element timer clock 112. The pulse provided at terminal GO is utilized to clear TC flip-flop 118. Initially, prior to the reception of a character, ST flip-flop 122 is in the clear condition as is TC flip-flop 118. Element timer clock 112 is normally disabled by the low voltage condition applied thereto from the "1" output terminal of TC flip-flop 118.

Element timer clock 112 preferably comprises a free-running multivibrator having a cyclic time corresponding to the incoming signaling rate. Accordingly, when enabled, clock 112, having a cyclic time corresponding to an element duration, provides a first pulse to output lead 114 which, as previously described, occurs at the element transition and is utilized as the pulse A shift pulse for shift register 108. At the theoretical midpoint of the incoming element, timer clock 112 completes one-half its cycle providing a pulse to lead 115 which, as previously described, is utilized for scanning the incoming elements by virtue of its application to gates 103 and 104, and further is utilized as the phase B shift pulse for register 108.

Assuming now that the start element of an incoming character is received on input terminal 101, this provides a negative going transition which is inverted by inverter 120 of clock circuit 119. A resultant positive going transition is therefore applied to the input pulsing lead of pulsing gate 121. The enabling lead to pulser gate 121 is connected to the "0" output terminal of TC flip-flop 118. Since TC flip-flop 118 is initially in the clear condition, the "0" output terminal thereof produces a high condition, which condition enables pulser gate 121. Accordingly, the positive transition applied to the input pulsing lead of gate 121 by inverter 120 in response to the start pulse transition produces a positive pulse at the output of gate 121 which sets ST flip-flop 122.

The setting of ST flip-flop 122 drives the "1" output thereof to the positive condition. With the "1" output of ST flip-flop 122 connected to the enabling input of pulser gate 124 and the set input of TC flip-flop 118, gate 124 is thereby enabled and TC flip-flop 118 is driven to the set condition. Accordingly, in response to the start pulse transition, ST flip-flop 122 and TC flip-flop 118 are placed in the set condition.

With TC flip-flop 118 in the set condition, the "1" output terminal thereof goes positive providing an enabling potential to element timer clock 112. Element timer clock 112 is thereby enabled and provides at the theoretical midpoint of the start element a phase B shift pulse to lead 115. Assuming that this is the first character, shift register 108 is empty and the phase B shift pulse is thus not utilized. Lead 115, however, is also connected to the input pulsing lead of gate 124. As previously described, gate 124 is enabled, passing the pulse applied thereto, to the clear input of ST flip-flip 122.

The clearing of ST flip-flop 122 removes the enabling potential applied from the "1" output terminal thereof to gate 124 whereby this gate is disabled, blocking subsequent clock pulses. In addition, the clearing of ST flip-flop 122 provides a positive going transition at the "0" output thereof and the transition is passed to monopulser 123. Monopulser 123 in turn is connected to OR gates 105 and 106, as previously described. Accordingly, the pulse generated at the output of monopulser 123 is passed through OR gates 105 and 106 to input terminals SI and MI of shift register 108. This inserts the double "1" bit at the theoretical midpoint of the incoming start element.

At this point, as previously described, ST flip-flop 122 is in the clear condition and TC flip-flop 118 is in the set condition. Clock 112 is thereby maintained enabled, providing the phase A shift pulse at each element transition and the phase B shift pulse and scanning pulse at each element midpoint. Thus, at the termination of the start element and the initiation of the first intelligence element the phase A shift pulse is produced, shifting the double "1" bit to the intermediate cores of the first stages. Thereafter at the midpoint of the first intelligence element the phase B shift pulse shifts the double "1" bit to the second stage and the scanning pulse produced concurrently therewith scans the midpoint of the first intelligence element, enabling gate 103 or gate 104 to insert the element in the appropriate store of shift register 108. Clock 112 continues to run, scanning each element and shifting the elements down the store until the entire character is inserted in shift register 108, at which time the double "1" bit enters the primary cores of the final stages of stores 109 and 110. At this time the GO output pulse is produced as previously described, whereby TC flip-flop 118 is restored to the clear condition. With the restoration of TC flip-flop 118 to the clear condition, element timer clock is again disabled. Clock circuit 119 is now restored to the initial condition awaiting the reception of a new character.

Upon the arrival of the start transition of the next character at input terminal 101, clock 119 is restarted to scan the next character in the same manner as the prior character. The first shift pulse, in this case the phase A pulse, now shifts the prior character to the intermediate cores. The double "1" bit of the prior character is thus shifted to the intermediate cores of the final stages of shift register 110.

The intermediate core outputs of the final stage of space store 108 and mark store 110 are applied to output MO extends to inhibit gate 131 and the output of inhibit gate 131 is connected to the clear input of OUT flip-flop 130. The set input of OUT flip-flop 130 is connected to output terminal SO of store 109. Accordingly, assuming that inhibit gate 131 does not have an inhibiting potential applied thereto, the outputs of stores 109 and 110 are passed to the set input and clear input of OUT flip-flop 130 whereby the flip-flop follows the shifting of the element bits to the final stage intermediate cores. The signal bits are in turn passed to the "0" output terminal of OUT flip-flop 130 which extends to output terminal 132.

A mark bit on terminal MO through gate 131 clears OUT flip-flop 130, thereby applying a positive condition to terminal 132. Conversely, a spacing bit on terminal SO sets flip-flop 130 and thus provides a negative condition to terminal 132. Accordingly, output terminal 132 provides serial signal elements corresponding to the element bits shifted to the final stages of shift register 108.

Recalling now that when the start element is shifted to the final stages of stores 109 and 110, a "1" bit is passed to both stages and thus to terminals MO and SO. To restore the signal, gate 131 is inhibited, blocking the pasage of the bit therethrough to clear input of OUT flip-flop 130. This is provided by connecting the inhibiting lead of gate 131 to the "1" output of ST flip-flop 122 in clock circuit 119. Therefore, when the start transition of the subsequent character is detected, flip-flop 122 is set, as previously described, and gate 131 inhibits the passage of the bit on terminal MO to OUT flip-flop 130. Since the double "1" bit is shifted to the intermediate cores of the final stages upon the detection of the start transition of the subsequent character, gate 131 is inhibited during the start element readout to block the "1" bit from mark store 110. At the same time, the output bit from space store 109 is passed to the set input of flip-flop 130. Thus in response to the readout of the double "1" bit start element in shift register 108, OUT flip-flop 130 is set and a low or spacing condition is applied to output terminal 132 corresponding to a spacing element.

The details of space store 109 and mark store 110 of dual-rail shift register 108, together with the details of AND gate 134, are shown in FIG. 2. Referring to FIG. 2, it is seen that space store 109 comprises a plurality of transfluxor magnetic cores arranged as a 9-stage shift register, each of the several stages in the shift register including a primary core and an intermediate core. Cores 201′ through 209′, with cores 204′ through 206′ not shown, constitute primary cores. Cores 201″ through 209″ constitute intermediate cores. The primary core and the intermediate core of each stage has the same base number, such as cores 201′ and 201″ in the initial stage of space store 109.

Mark store 110 is arranged in a manner similar to space store 109, with magnetic cores 211′ through 219′ constituting the primary cores and cores 211″ through 219″ constituting the intermediate cores. These cores are also wound to operate as a 9-stage transfluxor shift register.

Returning now to space store 109, the first stage thereof comprises cores 201′ and 201″ as previously disclosed. Each of the cores includes three apertures or holes, and as shown in FIG. 2, these apertures comprise a large center aperture and smaller outer apertures shown above and below the center aperture in FIG. 2. To operate as a shift register, an input winding "*i*" is threaded through one of the small apertures and an output winding "*o*" is threaded through the outer of the small apertures. With respect to core 201′, input winding "*i*" is connected to input terminal SI and output winding "*o*" is connected to input winding "*i*" of core 201″. Output winding "*o*" of core 201″ is in turn connected to input winding "*i*" of core 202′. The input and output windings of the successive cores are similarly interconnected whereby an input signal bit applied to terminal SI is inserted in core 201′, as described hereinafter, and thereafter shifted to core 201″ and thence to core 202′ and thereafter through the remaining cores of space store shift register 109.

Each of the cores also includes an additional winding "*a*" inserted through the major aperture. Winding "*a*" of core 201′ is connected to terminal PA which, as previously described, has applied thereto the phase A shift pulse. This shift pulse is passed in series through the winding "*a*" of all of cores 201′ through 209′. Winding "*a*" of core 201″ is connected to terminal PB which, as previously described, has applied thereto the phase B shift pulse. Thus, the phase B shift pulse is supplied in series to cores 201″ through 209″.

Space store shift register 109 also includes windings, not shown, for providing priming operation of the cores. The additional windings, the priming operation, and the detailed over-all description of a transfluxor shift register similar to space store shift register 109 is disclosed in an article entitled "Performance of an All-Magnetic Shift Register" by D. J. Morris in Proceedings of the Institute of Electrical Engineers, vol. III, No. 2, February 1964, pages 291 through 302.

Mark store 110 is wound in a similar manner as space store 109. An input winding "*i*" is threaded through one of the small apertures in each core and an output winding "*o*" is threaded through the outer small aperture. With winding "*i*" of core 211′ connected to input terminal MI and each output winding "*o*" connected to the input winding "*i*" of the next successive core, an input signal bit applied to input terminal MI is inserted in core 211′, thereafter shifted to core 211″ and thence to core 212′ and thereafter through the remaining cores of mark store 110. The cores also include windings "*a*" inserted through the major apertures, windings "*a*" of cores 211′ through 219′ being connected to terminal PA to receive the phase A shift pulse and windings "*a*" of cores 211″ through 219″ being connected to terminal PB to receive the phase B shift pulse. The cores also have additional priming windings, not shown, whereby mark store 110 operates in substantially the same manner as space store 109.

As previously described, at the theoretical midpoint of the incoming start element a "1" bit is supplied to input terminal SI thereby providing a current pulse through winding "*i*" of core 201′. This inserts a "1" bit in core 201′ concurrently with the application of a shift pulse to terminal PB. If it is presumed there are no prior characters in the shift register, then the phase B shift pulse has no effect at this time.

Similarly, at the theoretical midpoint of the start element, a "1" bit is applied to terminal MI and the resultant current pulse to winding "*i*" of core 211′ inserts a "1" bit in this core. Thus, in response to the reception of the start element, a double "1" bit is concurrently inserted in cores 201′ and 211′.

At the approximate termination of the start element and initiation of the first intelligence element, the phase A shift pulse is applied to terminal PA and thus to winding "*a*" of core 201′ and winding "*a*" of core 211′. As disclosed in detail in the above-identified article of D. J. Morris, the application of this shift pulse restores cores 201′ and 211′ to their initial state, thus inducing a voltage across winding "*o*" of the cores. This results in the application of current to windings "*i*" of cores 201″ and 211″ whereby the "*i*" bits are transferred from cores 201′ and 211′ to 201″ and 211″.

At the theoretical midpoint of the first intelligence element, a "1" bit is applied to input terminal SI if the element is spacing, or to input terminal MI if the element is marking. Accordingly, a "1" bit is inserted in cores 201′ or 211′, depending upon whether the first intelligence element is spacing or marking. Concurrently therewith, a phase B shift pulse is applied to terminal PB, resetting cores 201″ and 211″ since both of these later cores were set by the "1" bits previously inserted in both cores. Accordingly, output windings "*o*" of both cores 201″ and 211″ have voltages induced across them, resulting in current being applied to input winding "*i*" of cores 202′ and 212′. Therefore, when the first intelligence element is inserted in core 201′ or 211′, the double "1" bit is inserted in cores 202′ and 212′.

Upon the application of the phase A shift pulse to terminal PA, the "1" bit stored in the primary cores are shifted to the intermediate cores of the corresponding stages. Thus the dougle "1" bit in cores 202′ and 212′ is shifted to cores 202″ and 212″ in substantially the same manner as previously described with respect to the first stage. Concurrently therewith the "1" bit previously stored in core 201′ or 211′ in response to the first intelligence element is shifted to the corresponding intermediate core of the same stage.

In a similar maner the second intelligence element is stored in the appropriate core of the first stage, the first intelligence element is shifted to the appropriate primary core in the second stage, and the double "1" bit defining the start element is shifted to primary cores 203′ and 213′ of the third stage of space store 109 and mark store 110.

With the reception of the subsequent signal elements of the code character, the bits are further shifted down space store 109 and mark store 110 until the theoretical midpoint of the eighth intelligence element. At this time the double "1" bit of the start element is shifted to cores 209′ and 219′ of the last stage and the eight intelligence elements are all stored in the first eight stages. Accordingly, the full data character is now stored in the dual-rail shift register.

As described heretofore, gate 134 functions to detect the double "1" bit in the last stage of dual-rail shift register 108. Referring to FIG. 2, it is seen that gate 134 includes transistors 230 and 233. The base of transistor 230 is connected to its emitter by way of lead 231, a winding threaded through the major aperture of core 209′, and lead 232. The base of transistor 233 is connected to its emitter by way of lead 234, a winding threaded through the major aperture of core 219′, and lead 235, while the emitter of transistor 233 is connected to ground by way of resistor 238.

When a "1" bit is inserted in core 209′, indicating the shifting of a space bit to the last stage of space store 109, a positive voltage is induced in the winding interconnecting lead 231 and lead 232 in response to the phase B shift pulse. Accordingly, the base of transistor 230 is rendered positive with respect to its emitter. The transistor is therefore forward biased. Similarly, when a marking bit is shifted to the last stage of mark store 110, the induced voltage applied to lead 234 in response to the phase B shift pulse renders it positive with respect to its emitter, therefore forward biasing transistor 233. In the event that "1" bits are concurrently inserted in the final stage of space store 109 and mark store 110, both transistors 230 and 233 are forward biased permitting the flow of current from the positive battery through the collector to the emitter path of transistor 230 and the collector to emitter path of transistor 233, raising the potential on the emitter of transistor 233. Since the concurrent insertion of bits in both of the last stages of space store 109 and mark store 110 occurs only when the start element is shifted thereto, it is apparent that the emitter of transistor 233 and therefore terminal GO connected thereto goes positive only when the start element is detected in the final stages of the shift register 108. Accordingly, as previously described, terminal GO goes positive when the double "1" bit start element is shifted to the final stage of the shift register.

As previously described, the conditions of the several stages of the shift register are concurrently examined and provided to output terminal DO. Referring to FIG. 2, it is seen that terminal DO extends to lead 240, which lead is connected to winding "*d*" threaded through the major aperture of core 218'. Winding "*d*" of core 218' in turn is connected to winding "*d*" of core 208' and then in turn to the winding "*d*" of all of cores 201' through 207' and 211' through 217' terminating at terminal 220. It is noted that this detector lead extends to the primary core in one stage of mark store 110 and the primary core of the corresponding stage in space store 109, wound in one sense in the mark store core and wound in the opposing sense in the space store core. Accordingly, either an aiding voltage or an opposing voltage will be applied to terminal DO, depending upon whether a space bit or a mark bit is stored in these corresponding stages when a phase B shift pulse is applied thereto. A resulting voltage is thus provided to terminal DO depending on the sum of the aiding voltages less the sum of the opposing voltages. By winding the primary cores of the several stages of space store 109 and mark store 110 in the manner disclosed in Patent No. 3,219,998, issued to G. P. Houcke on Nov. 23, 1965, the particular arrangements of windings "*d*" may be set in accordance with a selected code character such as the ASCII code character J. The initial intelligence element of the code character J is space. It is seen that winding "*d*" of core 208' induces an aiding voltage if a bit is shifted thereto in response to a space element, while winding "*d*" of core 218' induces an opposing voltage if a bit is inserted in response to a mark element. Thus, terminal DO will be provided by an incremental aiding voltage by core 208' if the first intelligence element is space as indicated by the insertion of a "1" bit in core 208'.

Similarly, each of the other stages are wound to provide an aiding voltage in the event an appropriate mark or space bit is inserted therein and an opposing voltage in the event that an improper signal element, with respect to the character J, is inserted therein.

As further shown in the above-identified patent of G. P. Houcke, the detector winding includes a bias arrangement for eliminating the application of any positive potential to terminal DO except in the event that the appropriate signal elements individual to character J are sensed by the "*d*" windings. This bias winding is connected to terminal 220 and then extends through windings "*b*" threaded in series through the major apertures of cores 201' through 207' and then through windings "*b*" threaded through the major apertures of cores 211' through 217'. The bias winding is then connected to a source of constant voltage such as ground, as shown in FIG. 2. These bias windings, as disclosed in the patent of G. P. Houcke, provide an opposing voltage in response to the insertion of a "1" bit in each of these cores. Since seven stages of cores are involved, the accumulated opposing voltages involve seven increments. Upon the reception of the character J, however, eight increments of aiding voltage are induced in the detector windings whereby a resultant positive voltage is applied to terminal DO only in the event that these selected signal increments of the character J are inserted in the first eight stages of shift register 108. Accordingly, as fully described in the patent of G. P. Houcke, when a predetermined character such as the character J is inserted in shift register 108, the induced aiding voltages exceeding the opposing voltages from the bias windings and a positive pulse is provided to output terminal DO. For any other character the opposing voltages induced in the bias windings and in the detector windings by the unappropriate elements exceed the aiding voltage precluding the application of a positive pulse to terminal DO.

As previously described, the serial output is derived from the intermediate cores 209'' and 219'' of the final stages of shift register 108. These cores accept the double "1" start signal when a phase A pulse restores cores 209' and 219', which phase A pulse comprises the first clock pulse generated upon the detection of the start pulse transition of the subsequent character. Thereafter the phase B pulses clear cores 209'' and 219'' and subsequent phase A pulses shift successive element bits into cores 209'' and 219'' until the eighth intelligence element, which is always marking as previously explained, is inserted therein. At this point core 219'' has a marking "1" bit stored therein, which bit is cleared by the phase B shift pulse, which also shifts the start element of the subsequent character into the primary cores of the last stages. Since the clock is stored at this point, as previously described, cores 209'' and 219'' remain in this condition until the next incoming start pulse transition is detected shifting the start element of the subsequent character thereto.

Core 209'' includes a winding threaded through the major aperture thereof, which winding extends from one side thereof to space output terminal SO, and from the other side thereof to ground. When a "1" bit is inserted in core 209'' by core 209' in response to a phase A shift pulse a voltage is induced across this output winding applying a positive pulse to output terminal SO. Accordingly, output terminal SO provides an output pulse when a spacing bit is stored in the last stage of space store 109. As previously described, terminal SO comprises the spacing output terminal for deriving the serial elements from dual-rail shift register 108.

Marking output terminal MO is connected to a lead threaded through the major aperture of core 219'' which lead then extends to ground. Accordingly, when a "1" bit is inserted in core 219'', an induced positive pulse is applied to output terminal MO, indicating the storage of a marking bit in the last stage of mark store 110. It is thus seen that a double rail output is derived from the dual-rail shift register 108 at output terminals SO and MO, which signals as previously described are applied to OUT flip-flop 130 shown in FIG. 1.

Although a specific embodiment of the invention has been shown and described, it will be understood that various modifications may be made without departing from the spirit of this invention and within the scope of the appended claims.

What is claimed is:

1. In combination, a multistage dual-rail shift register and means for receiving binary element data code characters, said receiving means including means responsive to the reception of each of said elements for applying a signal bit to an initial stage of a selected one of said rails in accordance with the binary condition of said element, and means responsive to the reception of each of said characters for applying a signal bit to said initial stages of both of said rails of said shift register.

2. In combination, a multistage dual-rail shift register and means for receiving binary element data code characters in accordance with claim 1, wherein said receiving means further includes clock means responsive to the reception of each of said characters for applying shift pulses to said shift register and means responsive to the concurrent advance of said signal bits to corresponding final stages in both of said rails for stopping said clock.

3. In combination, a multistage dual-rail shift register and means for receiving binary element data code characters in accordance with claim 2, and further including means for reading out signal bits advanced to a final one of said stages of both said rails of said shift register and means responsive to said clock upon said concurrent advance of said signal bits to said final stages of both of said rails for inhibiting said reading out of a selected one of said rails.

4. In combination, a multistage dual-rail shift register and means for receiving binary element data code characters in accordance with claim 2, and further including detector means connected to a plurality of said stages of both of said rails of said shift register for concurrently reading signal bits advanced thereto and means responsive to the concurrent advance of said signal bits to said final stages of both of said rails for enabling said detector means.

5. A converter for serially received binary element data characters, each of said characters preceded by a start element, said converter including a dual-rail shift register each of said rails having a plurality of stages sufficient in number to store the elements of a data character, and means responsive to the reception of each of said character elements for applying a signal bit to an initial stage of a selected one of said rails in accordance with the binary condition of said element, the improvement comprising means responsive to the reception of each of said start elements for applying a signal bit to said initial stage of both of said rails and means for detecting the completion of said storage of said data character in said shift register, said detecting means including means responsive to the current advance of signal bits to corresponding ones of the final stages of both of said rails.

References Cited

UNITED STATES PATENTS

| | | | |
|---|---|---|---|
| 3,064,889 | 11/1962 | Hupp | 235—92 |
| 3,291,910 | 12/1966 | Nicklas | 178—26 |
| 3,300,775 | 1/1967 | Dowling | 340—348 |

DARYL W. COOK, Primary Examiner

J. GLASSMAN, Assistant Examiner

U.S. Cl. X.R.

340—347